US009489716B1

(12) United States Patent
Ogale et al.

(10) Patent No.: US 9,489,716 B1
(45) Date of Patent: Nov. 8, 2016

(54) STREET-LEVEL IMAGERY ACQUISITION AND SELECTION

(71) Applicant: Google Inc., Mountain View, CA (US)

(72) Inventors: Abhijit S. Ogale, Mountain View, CA (US); Rodrigo L. Carceroni, Mountain View, CA (US); Carole Dulong, Saratoga, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 14/691,719

(22) Filed: Apr. 21, 2015

Related U.S. Application Data

(63) Continuation of application No. 13/246,456, filed on Sep. 27, 2011, now Pat. No. 9,036,000.

(51) Int. Cl.

| | |
|---|---|
| ***H04N 5/00*** | (2011.01) |
| ***G06T 3/40*** | (2006.01) |
| ***G06T 3/00*** | (2006.01) |
| ***H04N 7/18*** | (2006.01) |
| ***H04N 5/262*** | (2006.01) |
| ***H04N 5/232*** | (2006.01) |
| ***G01C 21/36*** | (2006.01) |

(52) U.S. Cl.
CPC ......... *G06T 3/4038* (2013.01); *G01C 21/3667* (2013.01); *G06T 3/0062* (2013.01); *H04N 5/23238* (2013.01); *H04N 5/2628* (2013.01); *H04N 7/183* (2013.01)

(58) Field of Classification Search
CPC ........ G06K 9/36; G06K 9/00; G06T 7/0071; G06T 15/00; G06T 3/0062; G06T 17/05; G06T 19/00; G01C 21/34; G01C 21/3647; G01C 11/02; G09G 5/00; G06F 3/048; G06F 15/16; G06F 17/30241; G06F 3/0481; H04N 5/225; H04N 7/00; G01S 19/14; G01S 19/49; G03B 37/06
See application file for complete search history.

(56) References Cited

U.S. PATENT DOCUMENTS 7,158,881 B2 * 1/2007 McCarthy ................. B60R 1/12 340/461
7,746,376 B2 * 6/2010 Mendoza ............ G06F 3/04815 348/36
7,843,451 B2 * 11/2010 Lafon .................. G06T 15/205 345/423
8,525,825 B2 * 9/2013 Zhu ......................... G06T 15/06 345/419
2007/0122058 A1 * 5/2007 Kitaura ................. G06T 7/0071 382/284
2007/0296807 A1 * 12/2007 Foote .................... G06T 7/0022 348/36
2009/0167563 A1 * 7/2009 Liang ....................... G08G 1/08 340/928
2009/0240431 A1 * 9/2009 Chau ................. G01C 21/3647 701/532
2011/0214072 A1 * 9/2011 Lindemann ............ G01C 11/02 715/757
2011/0254915 A1 * 10/2011 Vincent .................. G06T 17/05 348/36

* cited by examiner

*Primary Examiner* — Jay Patel
*Assistant Examiner* — Frank Huang
(74) *Attorney, Agent, or Firm* — Lerner, David, Littenberg, Krumholz & Mentlik, LLP

(57) ABSTRACT

A street-level imagery acquisition and selection process identifies which images are published in a street field view. An imagery database includes panoramas each corresponding to a set of images acquired from a single viewpoint. The panoramas are attached to corresponding positions on a road network graph. The graph is divided into a set of selection paths, each of which includes a topologically linear sequence of road segments. Each selection path is evaluated to select a set of panoramas to be published in the path. Panoramas of interior road segments are selected before panoramas at intersections. Selected panorama identifiers for each interior road segment of the selection paths and each intersection correspond to a position along the road network graph. The selected panorama identifiers are then published in the street field view.

20 Claims, 7 Drawing Sheets

STREET-LEVEL IMAGERY ACQUISITION AND SELECTION

CROSS-REFERENCE TO RELATED APPLICATIONS

The present application is a continuation of U.S. patent application Ser. No. 13/246,456, filed Sep. 27, 2011, the disclosure of which is incorporated herein by reference.

BACKGROUND

A panoramic view of a geographic area may be provided in response to a request from a user. Specific panoramic images may be collected from various positions along different streets using specially adapted acquisition vehicles. The acquisition vehicles may be equipped with directional or omnidirectional cameras for capturing 360° views, global positioning system (GPS) units for recording positions where images are captured, odometry units and inertial sensors for recording the differential movement of the vehicle, and antennas for scanning wireless network access points and recording corresponding wireless network strengths at the position where an image is captured. Due to the large amount of information that is collected, organization and retrieval of the different panoramic views may become problematic. Specifically, if a subset of all available panoramas is chosen to satisfy storage and serving capacity constraints, the panoramic views that are displayed in response to a user request may not cover the entire geographic area and/or may not be of the best available quality.

SUMMARY

Aspects of the present disclosure relate generally to street-level imagery acquisition and selection. An imagery database includes a number of panoramas each corresponding to a set of images acquired from a single viewpoint. The panoramas are attached to corresponding positions on a road network graph. The resulting graph is divided into a set of selection paths, each of which includes a topologically linear sequence of road segments and the corresponding panoramas. A panorama having a highest priority is identified as a path seed. The trajectory of an acquisition vehicle is followed beginning from the path seed to construct a selection path. This process is repeated starting from the next highest priority panorama still not covered, so as to cover the road segments of the graph.

Each selection path is evaluated separately to select a set of panoramas to be published in the path. Panoramas of interior road segments are selected before panorama at intersections. A list of selected panorama identifiers for each selection path and a list of selected panorama identifiers for each intersection are merged into one list of selected panorama identifiers, each corresponding to a position along the road network graph. The merged list of selected panorama identifiers is then published in a street field view.

In one aspect, a computer-implemented method includes associating a plurality of panoramas to corresponding positions on a road network graph. Each panorama includes at least one image captured at a geographic location of the corresponding position. The road network graph is divided into a plurality of selection paths. Each selection path includes one or more road segments, and each road segment is associated with the corresponding panoramas at positions associated therewith. One or more of the plurality of panoramas is selected for interior portions of each run segment in each selection path. One of the plurality of panoramas is selected for each intersection in each selection path. Identifiers for each panorama selected for each selection path or a selected intersection in the road network graph are published.

In another aspect, a system includes a processor configured to manage a plurality of modules. The modules include a panorama snapper module, a selection path creator module, a selection path optimizer module, a selection intersection creator module and a selection intersection optimizer module. The panorama snapper module is configured to associate a plurality of panoramas to corresponding positions on a road network graph. Each of the plurality of panoramas includes at least one image captured at a geographic location of the corresponding position. The selection path creator module is configured to divide the road network graph into a plurality of selection paths. Each selection path includes one or more road segments, and each road segment is associated with the corresponding panoramas at positions associated therewith. The selection path optimizer module is configured to select the one or more of the plurality of panoramas for interior portions of each run segment in each selection path. The selection intersection creator module is configured to receive the plurality of selection paths from the selection path creator and identify at least one intersection in each selection path. Each intersection is associated with the corresponding panoramas at positions associated therewith. The selection intersection optimizer module is configured to select one of the plurality of panoramas for each intersection in the road network graph.

In one aspect, a computer-implemented method for selecting imagery includes associating a plurality of panoramas to corresponding positions on a road network graph. Each panorama includes at least one image captured at a geographic location of the corresponding position. The road network graph is divided into a plurality of selection paths. Each selection path includes one or more road segments, and each road segment is associated with the corresponding panoramas at positions associated therewith. One or more of the plurality of panoramas are selected for interior portions of each run segment in each selection path. Identifiers for each panorama selected for each selection path in the road network graph are published.

DETAILED DESCRIPTION

In accordance with some aspects of the present disclosure, a street-level imagery acquisition and selection process identifies which images are published in a street field view. An imagery database includes a number of panoramas each corresponding to a set of images acquired from a single viewpoint. The panoramas are attached to corresponding positions on a road network graph. The graph is divided into a set of selection paths, each of which includes a topologically linear sequence of road segments and the corresponding attached panoramas. Each selection path is evaluated to select a set of panoramas to be published in the path. Panoramas of interior road segments are selected before panoramas at intersections. Selected panorama identifiers for each interior road segment of the selection paths and each intersection each correspond to a position along the road network graph. The selected panorama identifiers are then published in a street field view.

Figure 1:
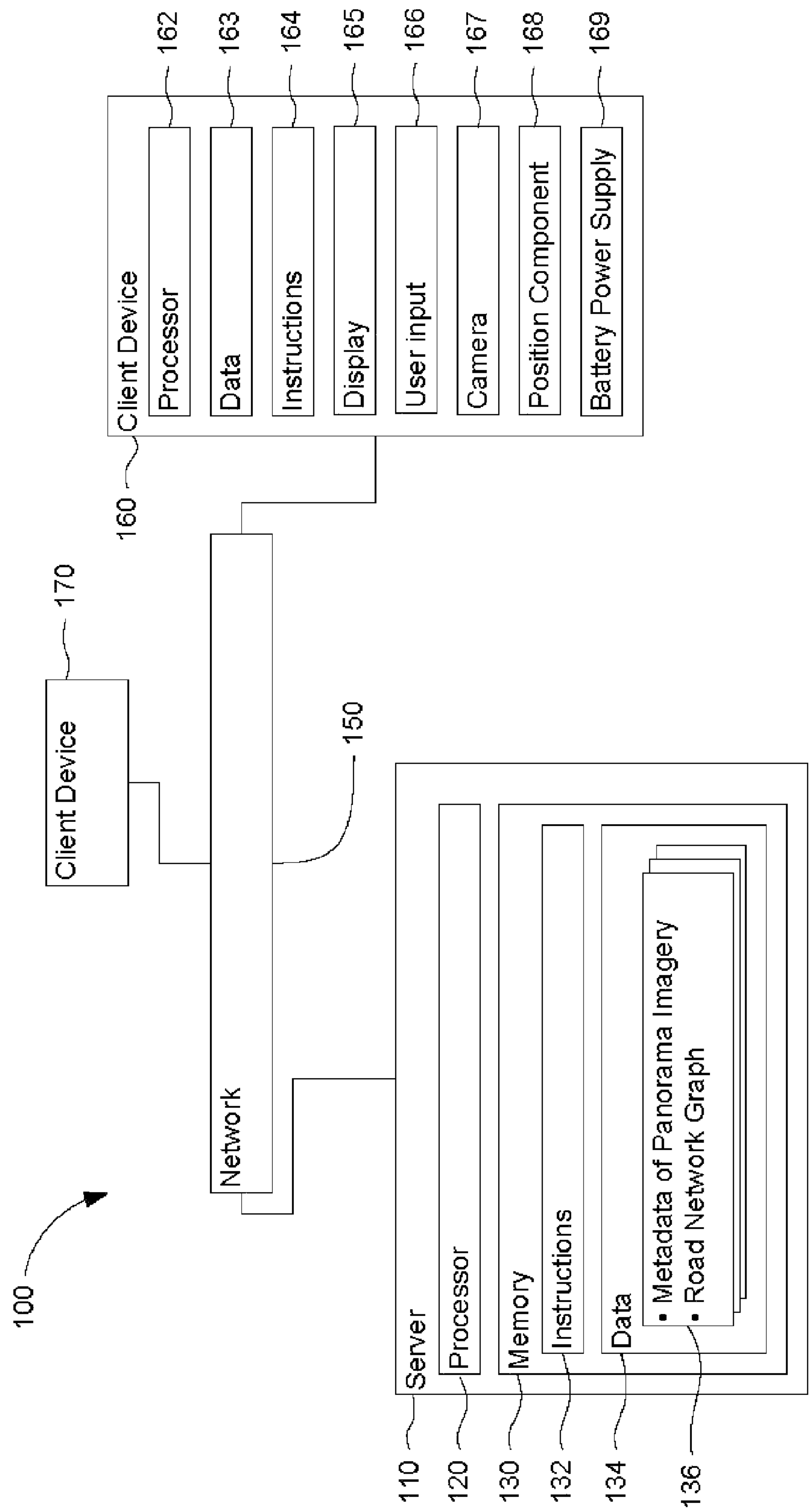
FIG. 1 is a functional diagram of a system in accordance with an example embodiment.
Figure 2:
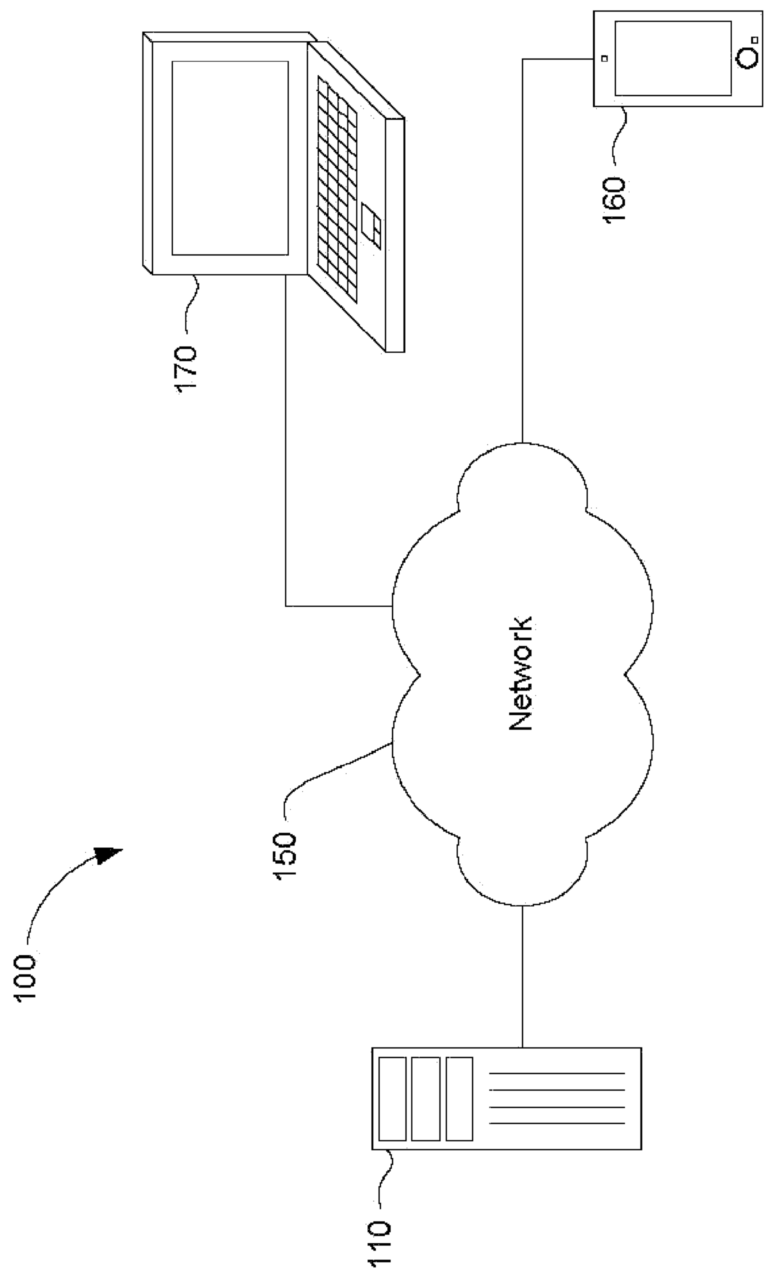
FIG. 2 is a pictorial diagram of the system of FIG. 1.

As shown in FIGS. 1 and 2, a system 100 in accordance with example embodiments includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the architecture is not limited by any particular data structure, the data may be stored in computer registers, in a relational database as a table having a plurality of different fields and records, etc. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data. Data 134 of server 110 may include data 136 corresponding to metadata of panorama imagery and a road network graph, which are described in detail below.

The processor 120 may be any conventional processor, such as a CPU for a personal computer. Alternatively, the processor 120 may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

Each client device 160 may be configured similarly to the server 110, with a processor, memory and instructions as described above. Each client device 160 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, gyroscope, speakers, a network interface device, a battery power supply 169 or other power source, and all of the components used for connecting these elements to one another.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

During a process of acquiring street-level outdoor imagery, acquisition vehicles often re-drive the same streets multiple times to keep such imagery up-to-date. For instance, after significant upgrades in acquisition hardware and/or software, high-value geographic areas are commonly driven again to ensure that imagery available for commonly accessed areas is of the highest quality possible. Due to processing, storage and serving capacity constraints, it is important to select carefully which part of a large proprietary street-level imagery database is published.

In order to maximize the value of the selected imagery, the selection process prioritizes several types of requirements that may be in conflict. Examples of such requirements include: acquisition-continuity requirements, spacing and coverage requirements, hard intrinsic constraints, and soft intrinsic constraints.

In the acquisition-continuity requirement, imagery is selected to cover locations that are spatially adjacent. An attempt is made to select images that have been acquired contiguously in time (e.g., during the same time period on the same day), and with the same acquisition hardware and software (e.g., the same acquisition vehicle). In one illustrative example, one segment of a road may be covered multiple times such that some images are captured during the morning and some images are captured in the afternoon. Since the panoramas are captured at different times, there may be differences in weather conditions or brightness due to sun position. In order to satisfy the acquisition-continuity requirement, the panoramas that are selected should each be associated with the same conditions.

In a spacing and coverage requirement example, an attempt is made to maintain spacing between consecutive selected imagery viewpoints that is equal to a predefined spacing while avoiding coverage gaps. In one illustrative example, a highway in a rural area is usually not visually stimulating. Most users do not spend much time looking at this type of street-level imagery. Accordingly, the spacing between panoramas may be selected to be sparse for such regions such that there is a minimal amount of overlap between adjacent panoramas. In contrast, for densely developed regions such as in urban areas, the spacing between panoramas may be selected to be closer and tighter in order to provide a more detailed panoramic view of the landscape. However, panoramas that are positioned closely together may waste computational resources and complicate navigation.

A hard intrinsic constraint refers to a property of the imagery which does not depend on its relationship to other types of imagery. An example of a hard intrinsic constraint includes selecting imagery that is acquired with out-dated acquisition systems only in areas that have not been covered using more recent imaging technology. If an image was captured with an old camera having a lot of noise, that kind of data should not be selected over an image captured by a newer camera. Other hard intrinsic constraint examples include image contrast, amount of noise, staging of the panorama, camera functionality at time of image capture, and time of day or night when image was captured.

A soft intrinsic constraint also refers to an independent imagery property, but the soft intrinsic constraint need not be satisfied under all conditions. In one illustrative example, a panorama acquired under direct sunlight illumination is generally preferred to imagery acquired under an overcast sky or at night. However, the panorama that includes the imagery that is captured under the overcast sky may be selected over the direct sunlight panorama if other criteria are improved (e.g., the overcast panorama may improve continuity).

Selection of street-level imagery from a large proprietary database may be approached as a single graph optimization problem, where the underlying graph describes a network of roads where the images were captured. In particular, given selection choices within a small spatial neighborhood of any image (i), the value of selecting i for publication depends only on the intrinsic properties of i and its selected neighboring images. Under this Markovian assumption, a full arsenal of tools available for Markov Random Fields may be leveraged to compute globally optimum selections. However, there are some drawbacks to such an approach: a) Markov Random Field methods that work in graphs with cycles are iterative (which may be computationally expensive and may not converge in a reasonable number of iterations); b) performing imagery selection as a single global optimization may propagate glitches with undesirable results; and c) complex cost functions may result that are difficult to tune to meet specific requirements and hard constraints.

As a compromise between global optimality and practicality, one aspect of the present disclosure deconstructs the street-level imagery selection process into a set of independent optimization problems on sub-graphs with linear topology (referred to as selection paths), and a final step for choosing imagery at intersections. Deconstructing imagery selection into a set of topologically linear problems leverages tools for Markov Chains. By deconstructing the complex graph problem into a number of linear topology graph problems, an efficient dynamic programming method (e.g., the Viterbi algorithm) may be used to obtain locally optimum solutions more efficiently than using a generic, single-step graph optimization.

Figure 3:
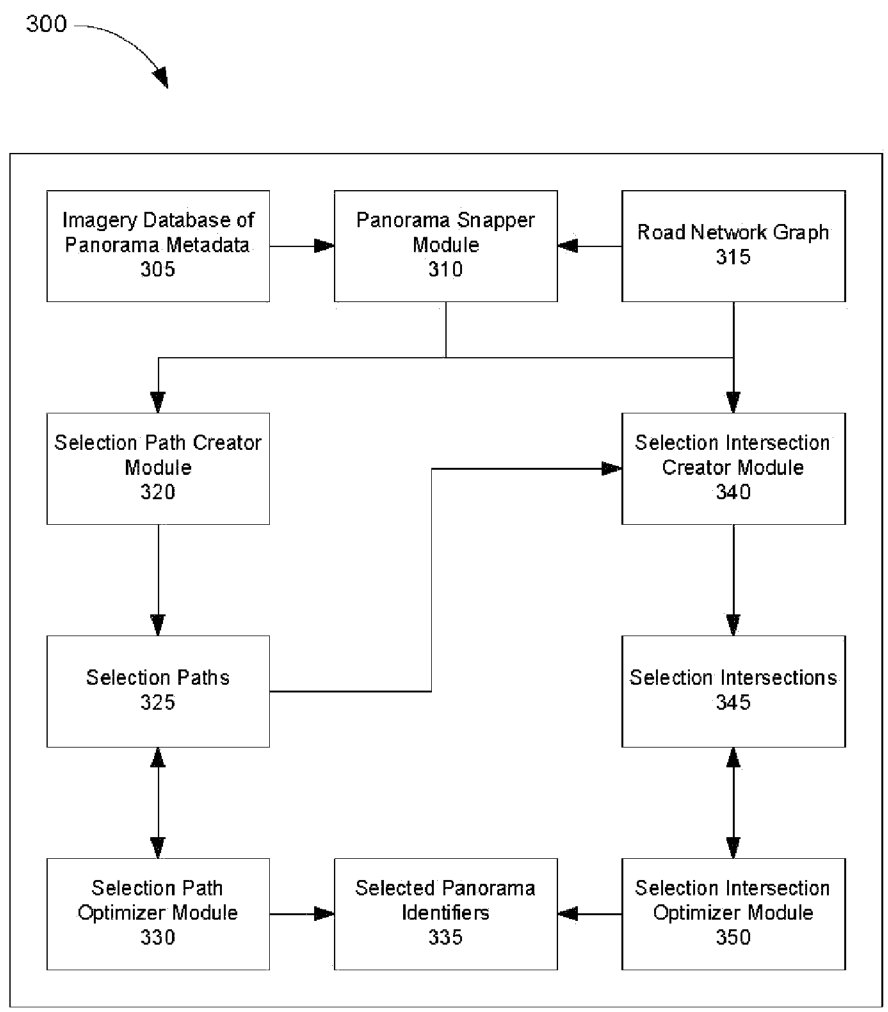
FIG. 3 is an exemplary block diagram in accordance with an example embodiment.
Figure 4:
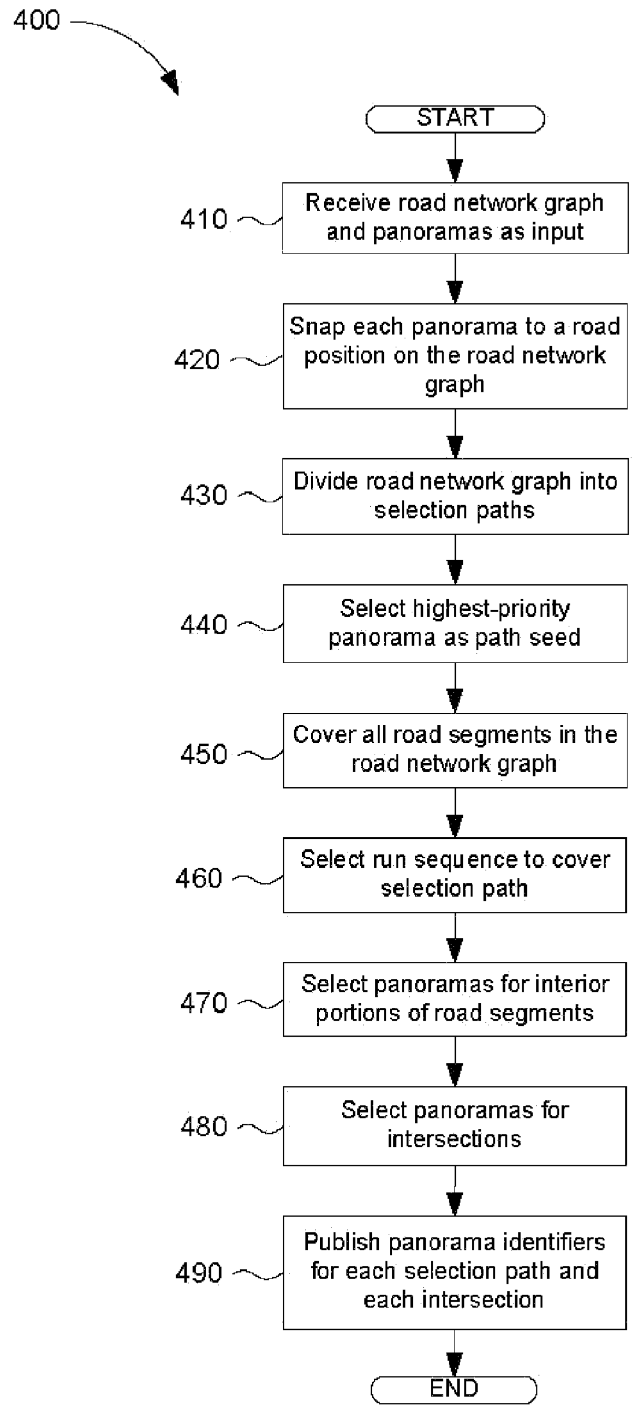
FIG. 4 is an exemplary flow diagram in accordance with an example embodiment.

An embodiment of a system 300 for selecting street-level imagery is shown in FIG. 3, and an embodiment of a process 400 for selecting street-level imagery is shown in FIG. 4. The system 300 includes an imagery database of panorama metadata 305, a panorama snapper module 310, a road network graph 315, a selection path creator module 320, a collection of selection paths 325, a selection path optimizer module 330, a collection of selected panorama identifiers 335, a selection intersection creator module 340, a collection of selection intersections 345 and a selection intersection optimizer module 350.

The imagery database 305 is organized into panoramas. Each panorama desirably includes a set of images acquired from a single viewpoint. Sensor data is attached to each panorama as metadata. Examples of the sensor data include a global positioning system (GPS) measurement, an odometer reading from the acquisition vehicle, and a speed and direction of the acquisition vehicle when the panorama was captured.

FIG. 4 is a flow diagram illustrating a process 400 for acquiring and selecting street-level imagery, which is discussed in relation to the system of FIG. 3 and examples illustrated in FIGS. 5, 6, 7*a* and 7*b*.

In a first step (block 410) of the process 400, the panorama snapper module 310 receives as input each panorama including the corresponding position-related measurements from the imagery database 305. The road network graph 315 is also input to the panorama snapper module 310. The road network graph 315 is a predefined road map that provides a topology of the roads.

Figure 5:
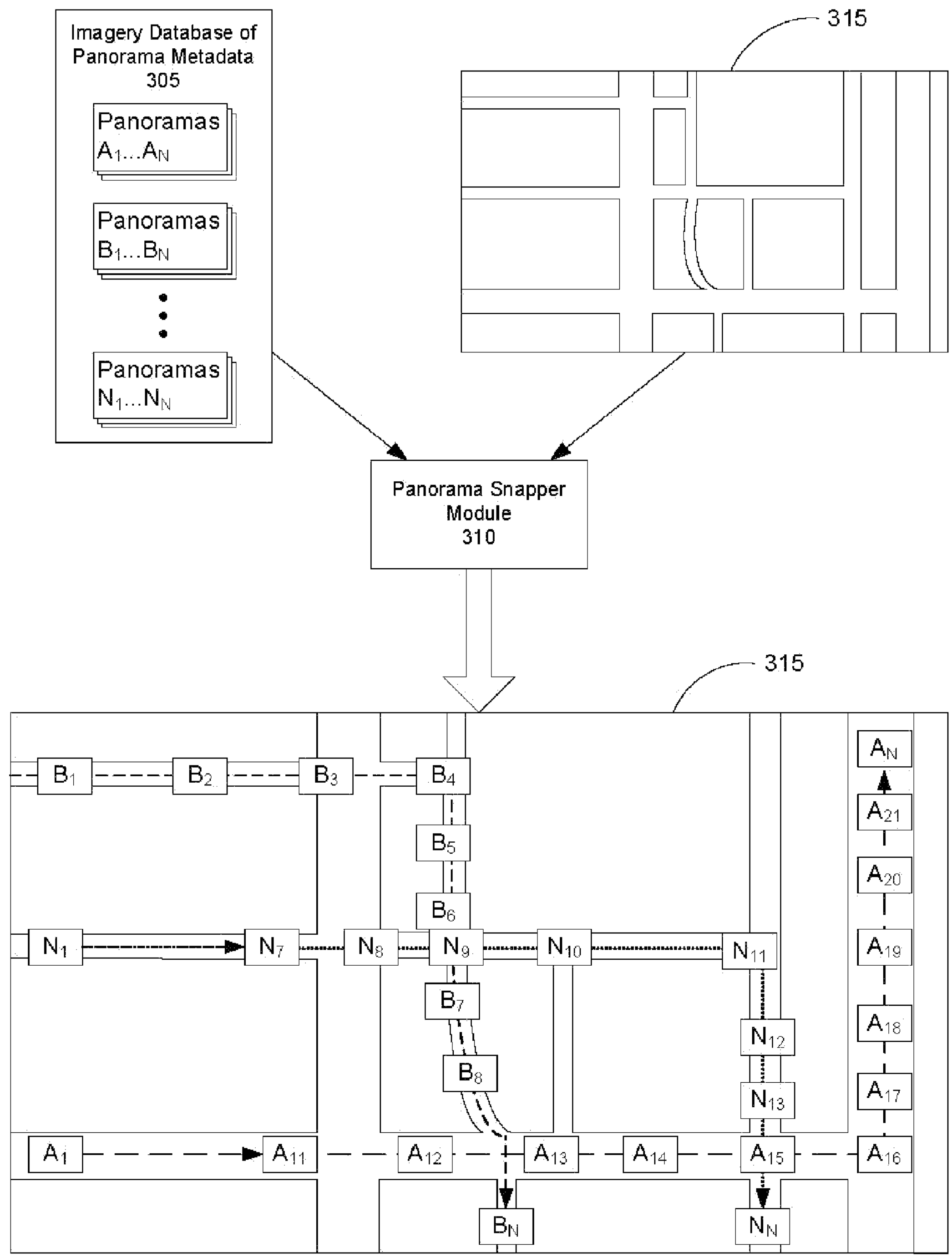
FIG. 5 is an exemplary block diagram in accordance with an example embodiment.

Referring also to the example of FIG. 5, the panorama snapper module 310 snaps (e.g., attaches or otherwise associates) each panorama (e.g., $A_1$-$A_N$, $B_1$-$B_N$, . . . , $N_1$ . . . $N_N$) to a corresponding road position on the road network graph 315 (block 420). Accordingly, each panorama is associated with a road segment identifier and a position on the road segment which together provide the panorama with an address.

The panorama snapper module 310 compensates for imprecise GPS data that may be associated with the panoramas. The GPS or other location related data that is collected when the panorama is captured may be imprecise for different reasons. For example, in a densely developed urban area, GPS signals may reflect off of buildings such that a street location may not be identifiable based on the GPS signals alone. The panorama snapper module 310 may overcome this imprecision by identifying relative positions based on, for example, known street arrangement and direction of legal vehicle movement (e.g., diagonal and one way streets).

Figure 6:
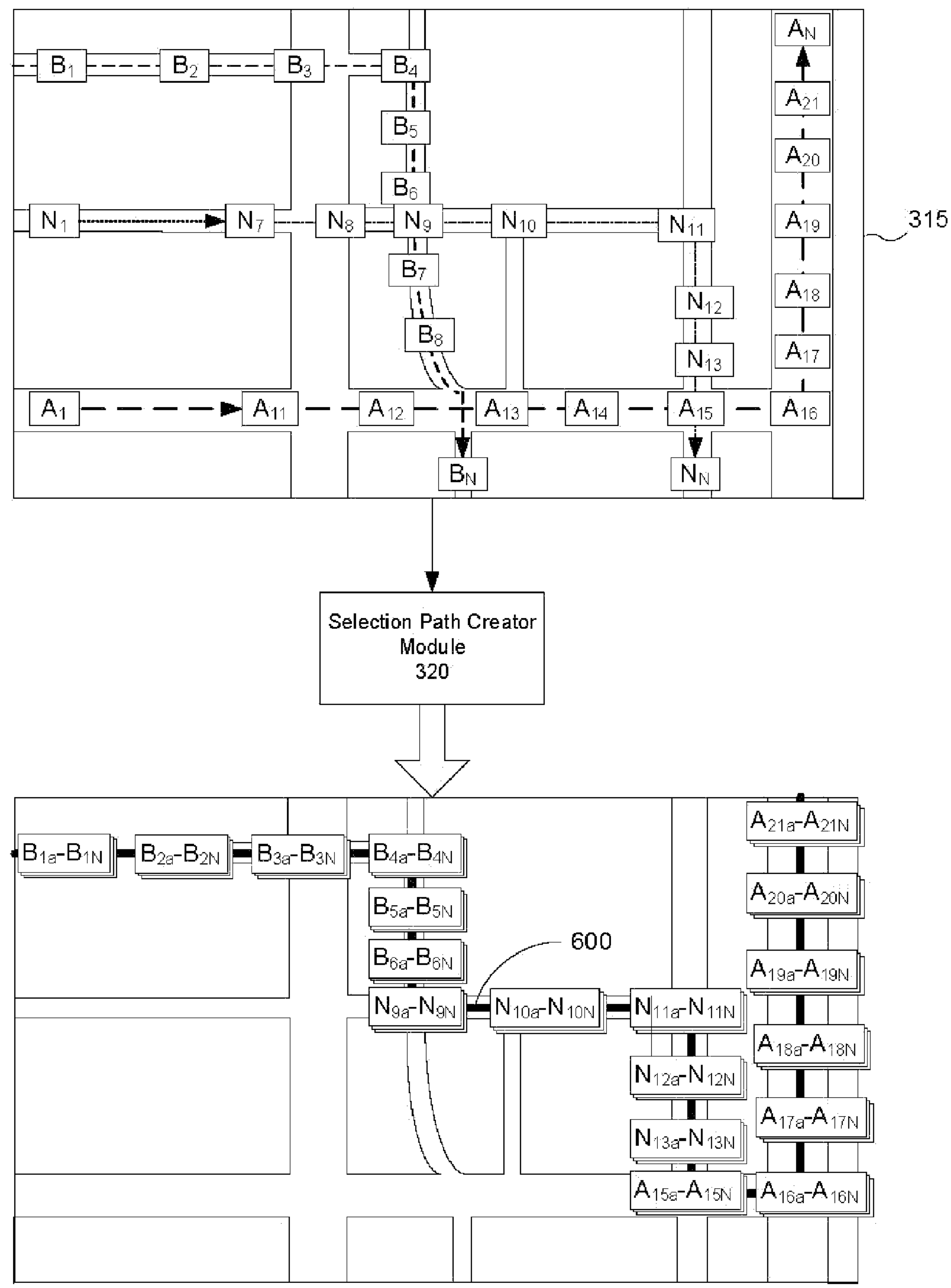
FIG. 6 is an exemplary block diagram in accordance with an example embodiment.

The road network graph 315 having the snapped panoramas is input to the selection path creator module 320. The selection path creator module 320 divides the road network graph 315 into the collection of disjointed selection paths 325 (block 430). Each selection path 325 includes a topologically linear sequence of the road segments within the road network graph 315 and the panoramas attached to each road segment. As shown in the example of FIG. 6, a selection path 600 may include panoramas $A_{15a}$-$A_{15N}$ . . . $A_{21a}$-$A_{21N}$, $B_{1a}$-$B_{1N}$ . . . $B_{6a}$-$B_{6N}$, and $N_{9a}$-$N_{9N}$ . . . $N_{13a}$-$N_{13N}$.

The selection path creator module 320 iterates over a priority-sorted list of panoramas and successively selects the highest priority panorama as a path seed (block 440). The priority may be based on, for example, which panorama is the most visually appealing. Starting from each seed position, the selection path creator module 320 follows the trajectory of the acquisition vehicle (both backward and forward along the road segment in time) until the selection path creator module 320 either reaches a road segment that has already been selected as part of a previous (or same) selection path or it reaches an extreme of the vehicle trajectory for the same acquisition date. Once the selection path creator module 320 covers a road segment, the segment is deleted from a global list of road segments. The selection path creator module 320 then iterates the process until all of the road segments in the road network graph 315 that have panoramas attached thereto are covered (block 450). The result may include one or more isolated road segments which may become a separate selection path with just one segment.

A selection path optimizer module 330 accepts each selection path 325 separately as input to resolve optimization for that path and choose a set of panoramas to be published in the path, excluding any intersections. Among the requirements that the selection path optimizer module 330 takes into account, resolving acquisition-continuity constraints and spacing constraints may be problematic because a desired spacing between panoramas may vary depending on the imagery. For example, in an area that may not be visually stimulating (e.g., an Interstate highway), a desired spacing is typically much larger than in an area with a high density of interest points. The selection path optimizer module 330 adapts panorama spacing on a per-panorama basis taking into account strength of visual parallax. Specifically, the selection path optimizer module 330 may, for example, use coarse facade depth estimates obtained from stereo vision triangulation to estimate a magnitude of parallax at each panorama. Desired spacing is increased for panoramas with limited parallax to expedite navigation in visually homogenous areas and to conserve computing resources in places where there is visual redundancy between panoramas.

An optimum number of selected panoramas for a given selection path depends on a choice of which imagery covers different parts of the path. Accordingly, the Viterbi algorithm, by itself, may not be particularly useful, because it requires a heuristic to estimate a number of panoramas that fit within each selection path, and because the set of panoramas that may be selected as the $i^{th}$ panorama along a selection path increases quickly with i. This means that the matrix of Viterbi states includes a large number of values. However, tossing all constraints and using an A* Search algorithm to find an optimum solution not only drains computational resources, it also leads to a cost functional that is difficult to tune.

In order to combine the efficiency and simplicity of the Viterbi algorithm with the power of the A* Search, the selection path optimizer module separates the problem of selecting panoramas to cover a selection path into two consecutive optimization problems: run selection and selection of individual panoramas.

In run selection, a sequence of runs is selected to cover as much of the selection path as possible (block 460). A run is a continuous sequence of panoramas acquired consecutively in time. Typically, a run occurs in one- or two-hour segments of continuous acquisitions as the acquisition vehicle drives along a series of streets. However, the panoramas from the imagery database have not been captured during a single, continuous acquisition. Accordingly, optimum selection of the panoramas is performed. In this phase, hard intrinsic constraints are respected to determine how to cover each particular road segment with one of the different continuous acquisitions. Soft intrinsic constraints, acquisition-continuity constraints, and avoidance of coverage gaps may also be optimized. But individual panoramas are not committed to and minimum panorama spacing constraints are disregarded until later.

Figure 7A:
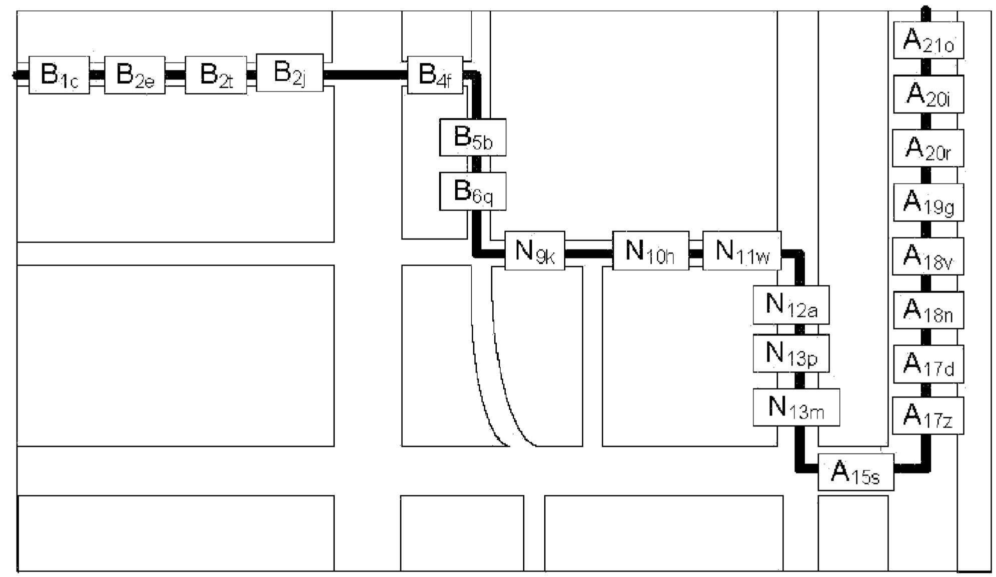
FIGS. 7*a* and 7*b* are exemplary block diagrams in accordance with an example embodiment.

In selection of individual panoramas, a smaller set of candidate panoramas is provided than for the run selection. For each street position, a determination is made whether or not to select a particular panorama. A* Search is used to select a subset of panoramas that respect hard constraints. Soft intrinsic constraints and desired spacing are satisfied as closely as possible. The panorama selection process is performed only for the interior portions of each road segment (block 470); intersections are not taken into account yet. As shown in the example of FIG. 7a, panoramas $B_{1c}$, $B_{2e}$, $B_{2t}$, $B_{2j}$, $B_{4f}$, $B_{5b}$, $B_{6q}$, $N_{9k}$, $N_{10h}$, $N_{11w}$, $N_{12a}$, $N_{13p}$, $N_{13m}$, $A_{15s}$, $A_{17z}$, $A_{17d}$, $A_{18n}$, $A_{18v}$, $A_{19g}$, $A_{20r}$, $A_{20i}$, and $A_{21o}$ are chosen for the selection path. Generally, intersections belong to more than one linear path. In complicated topologies, several different linear paths may cross at the same intersection. Accordingly, a different selection process may be used at intersections as discussed below.

A key advantage of this two-step approach of run selection and selection of individual panoramas is that disregarding minimum panorama spacing constraints makes usage of the Viterbi algorithm straightforward and yields a sparse graph of possible transitions among Viterbi states. The run selection step of the selection path optimizer module 330 initially sorts all panoramas of different runs attached to each selection path by the corresponding arc-length coordinate measured from the path start. Each panorama is treated as an optimization node having a state that is the run selected to cover the node's position on the selection path. Thus, given a particular state for a node, two possible transitions are considered. In the first transition, the same run is kept for the next node thereby excluding the next panorama from the set of candidate panoramas. In the second transition, a switch is made to the run of the next panorama. The Viterbi algorithm keeps track of multiple potential states per optimization node. While processing each new node, the algorithm evaluates up to 2S transitions, where S is the number of possible previous-node states.

Each of the two major optimization steps of the selection path optimizer module treats the problem of selecting K panoramas along a selection path as minimizing a cost function of the form:

$$\text{Cost}=-\text{Sum}\{i=1, \ldots ,K\}\text{intrinsic\_utility}(\text{selection}[i])+\text{Sum}\{i=1, \ldots ,K-1\}\text{transition\_cost}(\text{selection}[i],\text{selection}[i+1])$$

where:

selection[i] is the $i^{th}$ selected panorama along the path, intrinsic_utility(p) is the intrinsic utility of publishing panorama p, and transition_cost(p, q) is the computational cost of selecting panoramas p and q as neighbors along the selection path.

The term intrinsic_utility(p) takes into account a variety of factors that influence the utility of publishing a certain panorama, such as: a) operator-specified priority; b) in-production status (due to processing and storage capacity constraints, panoramas that have been published are more useful that those that have not); c) snapping confidence (the panorama snapper module generates a confidence signal—the higher the snapping confidence, the higher the utility of publishing a panorama); d) pose uncertainty (the higher the uncertainty about the pose of a panorama, the lower the panorama utility); e) time of acquisition (panoramas acquired at times when there is little or no daylight have lower utility); f) existence of Light Detection and Ranging (LIDAR) data (certain acquisition vehicles acquire LIDAR depth maps together with the imagery where the existence of such additional data boosts the priority of a panorama); g) entropy of color histograms (more colorful panoramas are generally preferable); and h) date of acquisition (all other factors being equal, panoramas captured more recently are preferred to older panoramas).

The term "transition_cost(p, q)" is different for each step of the selection path optimizer module. During the run selection step, transition cost(p, q) is equal to zero if p and q come from the same run but are otherwise equal to a fixed penalty. At the selection of individual panoramas step, transition_cost(p, q) depends on the distance between the snapped positions of p and q. Transition_cost(p, q) is zero if the distance between neighboring panoramas is equal to the desired panorama spacing at that point in the selection path. For actual distances smaller than the desired panorama spacing, the transition_cost(p, q) penalty increases exponentially. For distances larger than the desired panorama spacing, transition_cost(p, q) increases slowly.

Generally, intersections belong to more than one linear path. In complicated topologies, several different linear paths may cross at the same intersection. Accordingly, a different selection process is used at intersections than for the interior road segment selection process.

Each selection path 325 through the road network graph 315 has a linear topology and selected panoramas for the interior portions of the road segments. For the selection of panoramas at intersections, the selection intersection creator module 340 receives as an input the selection paths 325. The selection intersection creator module 340 is provided with the panorama selections for the portions of the interior road segments (e.g., panoramas $B_{1c}$, $B_{2e}$, $B_{2t}$, $B_{2j}$, $B_{4f}$, $B_{5b}$, $B_{6q}$, $N_{9k}$, $N_{10h}$, $N_{11w}$, $N_{12a}$, $N_{13p}$, $N_{13m}$, $A_{15s}$, $A_{17z}$, $A_{17d}$, $A_{18n}$, $A_{18v}$, $A_{19g}$, $A_{20r}$, $A_{20i}$, and $A_{21o}$) in order to determine which panoramas are to be selected at the intersections.

Figure 7B:
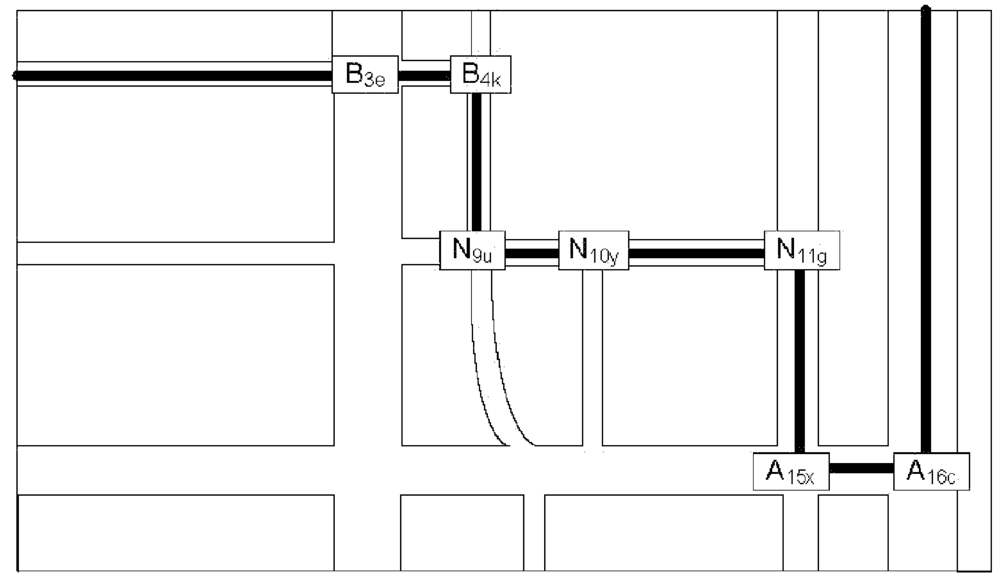

The selection intersection creator module 340 captures data needed to choose the most appropriate panorama at an intersection. The data may include the list of selection path segments incident at that intersection (with the corresponding selected panoramas) and the list of neighboring selection intersections that attach to the road segments that end at that particular intersection. The selection intersection creator module 340 then outputs instances of the selection intersections 345 (block 480). As shown in the example of FIG. 7*b*, panoramas $B_{3e}$, $B_{4k}$, $N_{9u}$, $N_{10y}$, $N_{11g}$, $A_{15x}$, and $A_{16c}$ may be chosen for the intersections of the selection path.

The selection intersection optimizer module 350 receives as an input the selection intersections 345, and performs a cost function optimization similar to that used in the selection path optimizer module 330, but with K=1. The selection intersection optimizer module 350 sorts the selection intersections 345 according to the operator-specified priority of the panoramas snapped near the intersections 345. For each intersection 345 in a selected order, the selection intersection optimizer module 350 treats the closest selected panorama along each incident segment (including panoramas already selected for higher-priority intersections) as hard constraints.

Most of the optimization criteria for the intersections are based on the intrinsic properties of the panoramas. However, many non-intrinsic properties may be used in the optimization of the intersections. In the case of intersections, the neighbors of each intersection are selected, but the intersection has not been selected. Each selected neighbor comes from a different run, but, in some cases, three or more streets from the same run may be aimed at the same intersection. In this case, the run that covers the three or more streets may be selected to maintain the continuity along the intersection.

In the cost function of the selection intersection optimizer module 350, there is no distance-based penalty since the selection of non-intersection panoramas avoids excessive proximity between non-intersection panoramas and intersections. A run switch penalty term may be included, but as a first-order (e.g., hard intrinsic) term instead of as a second-order term by substituting each pre-selected neighbor panorama as q and computing a linear combination of the resulting transition_cost(p, q) values. The term "intrinsic_utility(p)" of an intersection panorama includes additional intersection-specific constraints, such as a penalty for large distances to a center of the intersection. Since panoramas that are distant from the center of the intersection are more likely to have a limited view of the incident street segments, the visual experience obtained by displaying navigation links on them is likely to be inferior (e.g., users are more likely to be presented with navigation paths that extend through non-navigable areas).

The output of the system 300 may include: 1) a list of selected panorama identifiers 335 for each selection path output from the selection path optimizer module 330; and 2) a list of selected panorama identifiers 335 for each intersection output from the selection intersection optimizer module 350. According to one aspect, the two lists are merged into one list of selected panorama identifiers each corresponding to a position along the road network graph 315. The merged list of selected panorama identifiers is then published in the street field view (block 490).

As described above, a street-level imagery acquisition and selection process in accordance of the present disclosure identifies which images are published in a street field view. The imagery selection process includes a set of independent optimization problems on sub-graphs with linear topology (referred to as selection paths), and a final step for choosing imagery at intersections. Accordingly, an efficient dynamic programming method may be used to obtain locally optimum solutions more efficiently than generic graph optimization.

As these and other variations and combinations of the features discussed above can be utilized without departing from the scope of the claims, the foregoing description of exemplary embodiments should be taken by way of illustration rather than by way of limitation. It will also be understood that the provision of examples (as well as clauses phrased as "such as," "e.g.", "including" and the like) should not be interpreted as limiting; rather, the examples are intended to illustrate only some of many possible aspects.

The invention claimed is:

1. A computer-implemented method comprising:
   - dividing, using the one or more processors, a road network graph into a plurality of road segments;
   - associating, using the one or more processors, a given road segment with one or more candidate images captured at a geographic location corresponding to the given road segment;
   - receiving a user request for information associated with a portion of the road network graph;
   - determining, using the one or more processors, characteristics of the candidate images, the characteristics including visual properties, and the characteristics being prioritized such that a first type of characteristic is valued differently than a second type of characteristic;
   - selecting, using the one or more processors, one of the candidate images for interior portions of the given road segment, wherein the selecting is based at least in part on a highest priority characteristic; and
   - providing, in response to the user request, the selected candidate image.

2. The method of claim 1, further comprising:
   - dividing the road network graph into a plurality of intersections;
   - selecting another image for each intersection in the road network graph; and
   - providing, in response to the user request, the another image.

3. The method of claim 1, wherein the one or more candidate images are panoramic images.

4. The method of claim 1, further comprising identifying a selection path, the selection path including the given road segment and one or more additional road segments.

5. The method of claim 4, further comprising:
   - selecting one or more run sequences to cover the identified selection path, wherein each run sequence comprises a continuous sequence of panoramic images captured consecutively in time.

6. The method of claim 4, wherein the selected candidate image for the given road segment is a path seed, and the selection path is constructed beginning from the path seed.

7. The method of claim 1, wherein selecting one of the candidate images satisfies a predetermined condition, the predetermined condition comprising requirements based on at least one of:
   - an acquisition-continuity requirement that selects spatially adjacent panoramic images that comprise images captured under the same conditions;
   - a spacing and coverage requirement that maintains spacing between consecutively selected images; and
   - an intrinsic constraint requirement that corresponds to independent image properties.

8. A system comprising:
   - one or more memories storing a road network graph and a plurality of images;
   - one or more processors, in communication with the one or more memories, the one or more processors configured to:
     - receive a user request for information associated with a portion of the road network graph;
     - divide the road network graph into a plurality of road segments;
     - associate a given road segment with one or more candidate images of the plurality of images, the one or more candidate images captured at a geographic location corresponding to the given road segment;
     - determine characteristics of the candidate images, the characteristics including visual properties, and the characteristics being prioritized such that a first type of characteristic is valued differently than a second type of characteristic;
     - select one of the candidate images for interior portions of the given road segment, wherein the selecting is based at least in part on a highest priority characteristic; and
     - provide, in response to the user request, the selected candidate image.

9. The system of claim 8, wherein the one or more processors are further configured to:
   - divide the road network graph into a plurality of intersections;
   - select another image for each intersection in the road network graph; and
   - provide, in response to the user request, the another image.

10. The system of claim 8, wherein the one or more candidate images are panoramic images.

11. The system of claim 8, wherein the one or more processors are further configured to identify a selection path, the selection path including the given road segment and one or more additional road segments.

12. The system of claim 11, wherein the one or more processors are further configured to select one or more run sequences to cover each selection path, wherein each run sequence comprises a continuous sequence of panoramic images captured consecutively in time.

13. The system of claim 11, wherein the selected candidate image for the given road segment is a path seed, and the selection path is constructed beginning from the path seed.

14. The system of claim 8, wherein selecting one of the candidate images satisfies a predetermined condition, the predetermined condition comprising requirements based on at least one of:
    - an acquisition-continuity requirement that selects spatially adjacent images that comprise images captured under the same conditions;
    - a spacing and coverage requirement that maintains spacing between consecutively selected images; and
    - an intrinsic constraint requirement that corresponds to independent image properties.

15. The system of claim 11, wherein the one or more processors are further configured to publish identifiers for each image selected for each selection path in the road network graph.

16. A non-transitory computer-readable medium storing instructions executable by a processor to perform a method, comprising:
    - dividing a road network graph into a plurality of road segments;
    - associating a given road segment with one or more candidate images captured at a geographic location corresponding to the given road segment;

receiving a user request for information associated with at least one of the given road segment and the geographic location;

determining characteristics of the candidate images, the characteristics including visual properties, and the characteristics being prioritized such that a first type of characteristic is valued differently than a second type of characteristic;

selecting one of the candidate images for interior portions of the given road segment, wherein the selecting is based at least in part on a highest priority characteristic; and providing, in response to the user request, the selected candidate image.

17. The non-transitory computer-readable medium of claim 16, the method further comprising:

dividing the road network graph into a plurality of intersections;

selecting another image for each intersection in the road network graph; and providing, in response to the user request, the another image.

18. The non-transitory computer-readable medium of claim 16, the method further comprising identifying a selection path, the selection path including the given road segment and one or more additional road segments.

19. The non-transitory computer-readable medium of claim 18, the method further comprising:

selecting one or more run sequences to cover the identified selection path, wherein each run sequence comprises a continuous sequence of panoramic images captured consecutively in time.

20. The non-transitory computer-readable medium of claim 18, wherein the selected candidate image for the given road segment is a path seed, and the selection path is constructed beginning from the path seed.

* * * * *